United States Patent [19]

Kawasaki et al.

[11] Patent Number: 5,081,996
[45] Date of Patent: Jan. 21, 1992

[54] ULTRASONIC IMAGING APPARATUS

[75] Inventors: Schuichi Kawasaki, Tochigi; Nobuo Yamazaki, Ootawara; Takeshi Sato, Tochigi, all of Japan

[73] Assignee: Kabushiki Kaisha Toshiba, Kawasaki, Japan

[21] Appl. No.: 556,524

[22] Filed: Jul. 24, 1990

[30] Foreign Application Priority Data

Jul. 26, 1989 [JP] Japan .................................. 1-192851

[51] Int. Cl.⁵ ................................................ A61B 8/00
[52] U.S. Cl. ............................... 128/661.09; 73/861.25
[58] Field of Search ...................... 128/661.08-661.10, 128/660.05; 74/861.25

[56] References Cited

U.S. PATENT DOCUMENTS

| 4,817,619 | 4/1989  | Sugiyama et al. | 128/661.09 |
| 4,888,694 | 12/1989 | Chesarek        | 128/661.09 |
| 4,993,417 | 2/1991  | Seo             | 128/661.09 |
| 5,014,710 | 5/1991  | Maslak et al.   | 128/661.09 |

FOREIGN PATENT DOCUMENTS

0190979  8/1986  European Pat. Off. .
3417418  11/1985 Fed. Rep. of Germany .
3605163  8/1986  Fed. Rep. of Germany .
3614688  10/1986 Fed. Rep. of Germany .

Primary Examiner—Francis Jaworski
Attorney, Agent, or Firm—Cushman, Darby & Cushman

[57] ABSTRACT

An ultrasonic imaging apparatus comprises an ultrasonic transducer for transmitting ultrasonic beams to a subject and converting echoes from the subject to echo signals, a scan controller for selectively switching a scanning mode between a first scanning mode in which a predetermined number of rasters in each of a plurality of scanning blocks each having the predetermined number of rasters are scanned repeatedly and echo signals at a predetermined number of sample points in each of the rasters are extracted block by block and a second scanning mode in which a plurality of rasters are repeatedly scanned a predetermined number of times while at least one raster is shifted sequentially and data are output at constant intervals, a transmitter/receiver circuit for driving the ultrasonic transducer in accordance with a scanning mode selected by the scan controller, processes the echo signals output from the ultrasonic transducer to output an image signal and a television monitor for visually displaying the image signal.

6 Claims, 10 Drawing Sheets

FIG. 1

| NUMBER OF ALTERNATE RASTERS / PROBE DRIVE FREQUENCY | | F1 (MHZ) | F2 (MHZ) |
|---|---|---|---|
| BDF MODE | TWO RASTERS | SEQUENTIAL ALTERNATE SCAN | CONSTANT INTERVAL ALTERNATE SCAN |
| | MORE THAN TWO RASTERS | CONSTANT INTERVAL ALTERNATE SCAN | CONSTANT INTERVAL ALTERNATE SCAN |
| BDF/FFT MODE | MORE THAN ONE RASTER | CONSTANT INTERVAL ALTERNATE SCAN | |

FIG. 2A

| BDF MODE · ALTERNATE 2 RASTERS | | |
|---|---|---|
| DEPTH | LESS THAN D1 | CONSTANT INTERVAL ALTERNATE SCAN |
| | D1 & MORE THAN D1 | SEQUENTIAL ALTERNATE SCAN |

FIG. 2B

|  | MERITS | DEMERITS |
|---|---|---|
| CONSTANT INTERVAL ALTERNATE SCAN | TIME PHASE DIFFERENCE IN COLOR AND B-MODE IMAGE CAN BE REDUCED | THEORETICALLY RESIDUAL MULTI-COLOR NOISE IS GENERATED |
| SEQUENTIAL ALTERNATE SCAN | THEORETICALLY NO RESIDUAL MULTI-COLOR NOISE IS GENERATED | TIME PHASE DIFFERENCE MAY BE GENERATED IN COLOR AND B-MODE IMAGE |

ULTRASONIC IMAGING APPARATUS

BACKGROUND OF THE INVENTION

1. Field of the Invention

The present invention relates to an ultrasonic imaging apparatus for transmitting ultrasonic waves into a living body and imaging functional information about the movement of moving targets including blood flow in the living body.

2. Description of the Related Art

Such an ultrasonic imaging apparatus is designed to obtain a tomographic image (a B-mode image) and blood flow information by utilizing pulsed ultrasonic waves and the ultrasonic Doppler effect. The measurement of blood flow velocity by the ultrasonic imaging apparatus is made as follows That is, an ultrasonic beam is transmitted to blood flow within a living body by an ultrasonic transducer. At this time the ultrasonic beam is scattered from moving blood cells so that its center frequency fc is varied by a frequency fd due to Doppler shift. The receive frequency f is thus given by $$f = fc + fd$$

The frequencies fc and fd are related by $$fd = 2v \cos\theta \, fc/C$$

where v is the velocity of blood flow, $\theta$ is an angle made by the ultrasonic beam and the blood vessel and C is the velocity of sound. Therefore, the detection of the Doppler shifted frequency fd will allow the blood flow velocity v to be obtained.

In order to display the blood flow velocity v as a two-dimensional image on the basis of the above principle, the following ultrasonic scanning is made.

A subject under examination is subjected to sector scan or linear scan by pulses of ultrasonic waves from an ultrasonic transducer. In this case, several pulses of ultrasonic waves are transmitted in the same direction of raster and ultrasonic waves reflected from the blood flow within the subject, that is, echoes are received by the same ultrasonic transducer. The ultrasonic echoes are converted to electrical signals, i,e., echo signals. The echo signals are entered into a phase detector where Doppler shifted signals are extracted from the echo signals. At this time, the Doppler shifted signals corresponding to, for example, 256 sampling points which are set along the transmission path of the ultrasonic pulses are extracted. Each of the Doppler shifted signals extracted at a respective one of the sampling point is frequency analyzed by a frequency analyzer and then converted to a television signal by a digital scan converter (DSC) for display on a television monitor. Thereby, a velocity profile of blood flow in one scanning direction is displayed as a two-dimensional image in real time. The scanning is also made in the first through nth raster directions so that a blood flow image (a velocity profile of blood flow) is displayed for each of the rasters.

Incidentally, the detecting capability for low velocity of flow depends on the data length of a Doppler shift signal to be frequency-analyzed. That is, assuming a sampling frequency of the Doppler shift signal to be fr and the number of samples to be n, the data length T of the Doppler shift signal to be frequency-analyzed will be given by $$T = n/fr \tag{1}$$

Then, the frequency resolution fd will be given by $$fd = 1/T \tag{2}$$

Thus, the lower limit fdmin of the measurable blood flow will be given by $$fdmin = 1/T = fr/n \tag{3}$$

In order to detect low-velocity blood flow as well, therefore, it is necessary only that the sampling frequency fr of the Doppler shift signal be made low or the number n of samples be made large. However, two-dimensional Doppler information is obtained from the following equation.

$$FN \times n \times m \times (1/fr) = 1 \tag{4}$$

where FN is the number of frames, m is the number of scan lines and fr is the repetition rate frequency of ultrasonic transmit pulses. The number FN of frames is related to real time processing of two-dimensional blood flow image and generally lies in the range 8 to 30, thereby providing 8 to 30 images per second.

If, in the case of electronic sector scanning, the number m of scan lines is m=32, the repetition rate frequency fr of ultrasonic pulses is fr=4 KHz and the number n of samples is n=8, then the number FN of frames will be about 16. Also, there is the following relationship between the maximum depth of field-of-view Dmax and the pulse repetition rate frequency fr.

$$Dmax = C/(2 \times fr) \tag{5}$$

Therefore, a problem arises in that if fr is made high in order to improve the number of frames, the maximum depth of field-of-view cannot be made large. Also, if the number m of scan lines is made low, the scanning density will become coarse, degrading image quality. In summary, then, if the number of frames is improved, other properties are degraded.

To solve the above problems, a sequential alternate scanning method and a constant interval alternate scanning method have been developed. Those scanning methods are disclosed and described in U.S. patent application Ser. No. 228, 590 now U.S. Pat. No. 4,993,417 which is assigned to the same assignee as this application.

With the sequential alternate scanning method, as described in detail in the U.S. patent application, a fixed number of rasters in each of a plurality of scanning areas, i.e., a plurality of scanning blocks are scanned repeatedly and echo data at a predetermined number of sampling points of each raster are extracted block by block, thereby forming a blood flow profile.

According to the sequential alternate scanning method, the effective repetation rate frequency fr' of an ultrasonic transmit beam in the same direction is represented as follows:

$$fr' = fr/D \tag{6}$$

(a specific raster is scanned once each time D rasters are scanned)

The lower limit fdmin of the measurable blood flow can be decreased to 1/D of that of the conventional system described previously in which the transmission of an ultrasonic beam is repeated n times in the same direction and then the transmission of an ultrasonic beam is likewise made n times for the adjacent scan line. With this method, however, since the scanning area is divided into a plurality of blocks for scanning according to the sequence of transmission and reception of ultrasonic waves, there is a great time phase difference between rasters in each of blocks. This produces discontinuity in one frame of image. The more the number of rasters in each block in particular, namely, the number of alternate scans, the further the time phase difference deteriorates.

To decrease the time phase difference the constant interval alternate scanning method has been developed. According to this constant interval alternate scanning method, the scanning of a plurality of rasters is repeated a predetermined number of times with one raster being shifted for each scanning and data are output at constant intervals. The constant interval alternate scanning method will decrease the repetition frequency (the sampling frequency of the Doppler signal) of ultrasonic beams transmitted in the same direction to 1/D as with the sequential alternate scanning method described previously and moreover will uniform the time phase difference in one frame because data can be output at constant intervals. Even with this method, however, because the direction of the previous raster shifts, a residual echo signal in the outside of the depth of field-of-view will enter an image signal for the next raster. The residual echo signal will appear as a phase difference, thus generating residual multi-color noise on a display image. By way of example, into the ultrasonic scan line No. 3 is entered echo signals from the scan lines No. 2 and No. 4 immediately before and behind the scan line No. 3. Where there is a residual echo signal, therefore, an appreciable large phase difference will be generated between scan lines. Resultant residual multi-color noise will become a Doppler signal to degrade image quality.

SUMMARY OF THE INVENTION

It is an object of the present invention to provide an ultrasonic imaging apparatus which changes a scanning system according to a region to be observed and displays the observation region as a good image.

According to the present invention, there is provided an ultrasonic imaging apparatus in which, in order to obtain a good ultrasonic image, switching is made according to a subject between a constant interval alternate scan mode for eliminating time phase difference in a color mapping image and a B-mode image and a sequential alternate scan mode to eliminate influence that residual multi-color noise has.

That is, according to the present invention, there is provided an ultrasonic imaging apparatus including a scan switching circuit for selectively switching a scanning mode between a first and second scanning modes, the second scanning mode being for repeatedly scanning a predetermined number of rasters in each of a plurality of scanning blocks are, each of the rasters having a predetermined number of sample points, and echo signals at the sample points of the rasters are extracted block by block, and the first scanning mode being for repeatedly scanning a plurality of rasters a predetermined number of times while at least one raster is shifted sequentially and data are output at constant intervals.

In the above ultrasonic imaging apparatus, when an ultrasonic probe whose driving frequency is relatively low is used, it can be used with a relative deep depth in a field of view, for observing a relative deep portion of the subject, since the attenuation of reflected Doppler signal is low. Accordingly, if this low-frequency ultrasonic probe is driven by the constant interval alternate scan mode, the time phase difference and the residual multi-color noise are decreased, because the ultrasonic probe is used for a deep depth in a field of view or is driven by a low enlargement ratio mode.

When an ultrasonic probe whose driving frequency is relatively high is used, on the other hand, the use of the second scanning mode permits few residual multi-echoes to be generated and the time phase difference to be eliminated because the attenuation of the reflected Doppler signals is large.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description give above and the detailed description of the preferred embodiments given below, serve to explain the principles of the invention.

DETAILED DESCRIPTION OF THE PREFERRED EMBODIMENTS

Figure 1:
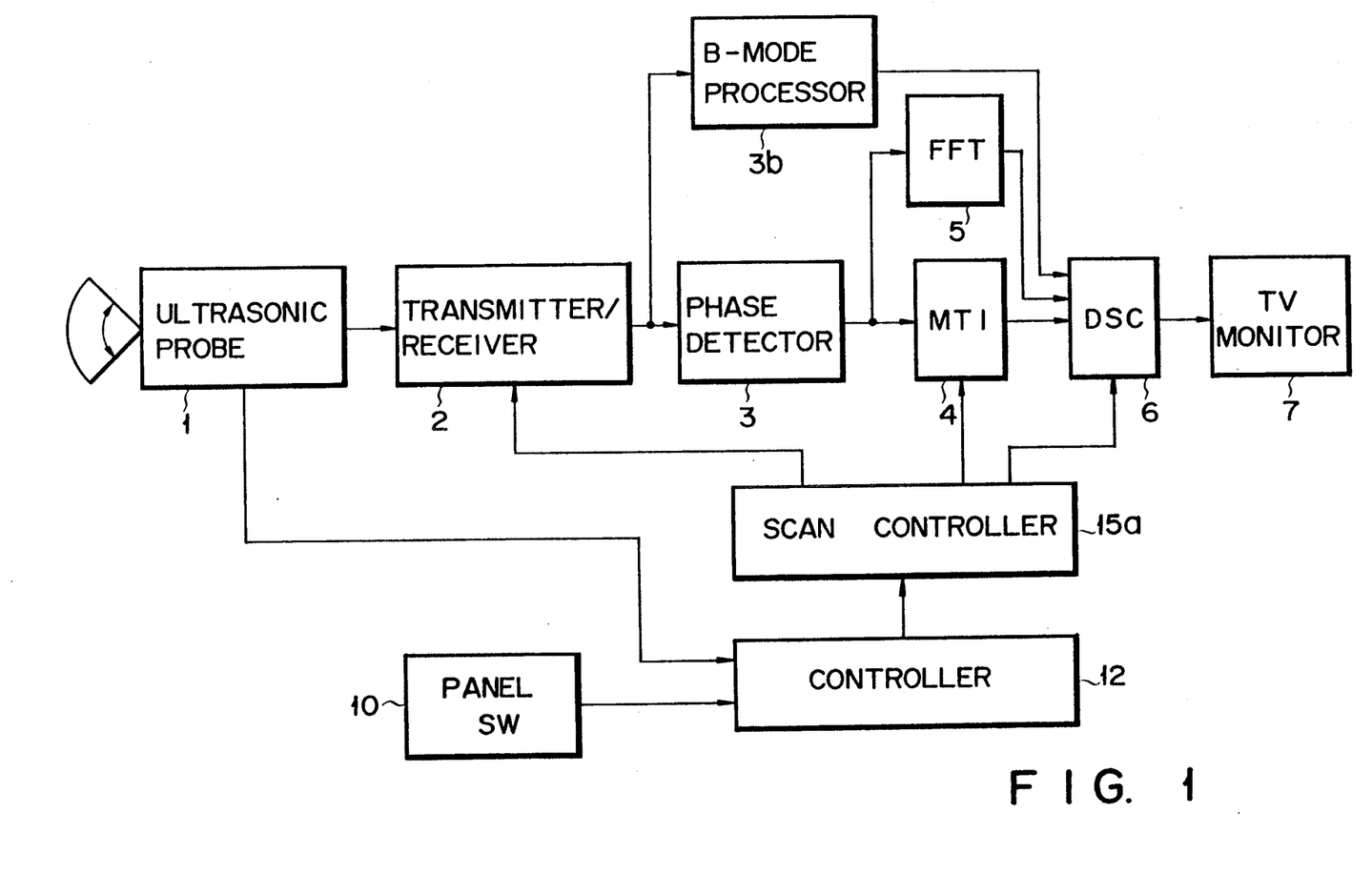
FIG. 1 is a schematic block diagram of an ultrasonic imaging apparatus according to an embodiment of the present invention.

Referring now to FIG. 1, an ultrasonic probe 1 comprises an ultrasonic transducer which transmits ultrasonic pulses to and receives ultrasonic pulses from a subject under examination and is connected to a transmitter/receiver circuit 2. The transmitter/receiver circuit 2 applies drive pulses to the ultrasonic probe 1 so as to transmit ultrasonic waves to the subject and receive echo signals from the ultrasonic probe for subsequent processing.

A phase detector 3a, which is connected to the transmitter/receiver circuit 2, phase-detects a receive signal from the transmitter/receiver circuit 2 to output a Doppler shift signal. A B-mode processing circuit 3b detects a B mode signal from the receive signal from the transmitter/receiver circuit 2. The detected B-mode signal is output to a DSC 6. An MTI (moving target indicator) 4, which is also called a CFM unit, filters an output signal of the phase detector 3 to extract a Doppler signal only and calculates mean velocity, turbulence and power of blood flow. An FFT (fast Fourier transformer) 5 analyzes frequency components of a blood flow signal from the phase detector 3a to obtain a frequency spectrum. The DSC 6 receives and stores output signals of the B-mode processing circuit 3b, the MTI 14 and the FFT 5 for conversion to a TV scan signal which is, in turn, output to a TV monitor 7.

A controller 12 supplies instruction signals specifying the number of repetitive scanning rasters (more than one or two) from a panel switch 10 to a scan controller 15a.

In the present embodiment, the scan controller 15a is provided which allows the transmitter/receiver circuit 2 to be switched between the sequential alternate scanning mode and the constant interval alternate scanning mode according to the number of repetitive scanning rasters and a probe driving frequency. Also, the scan controller 15a controls the MTI 14 and the DSC 6.

Figure 2A:
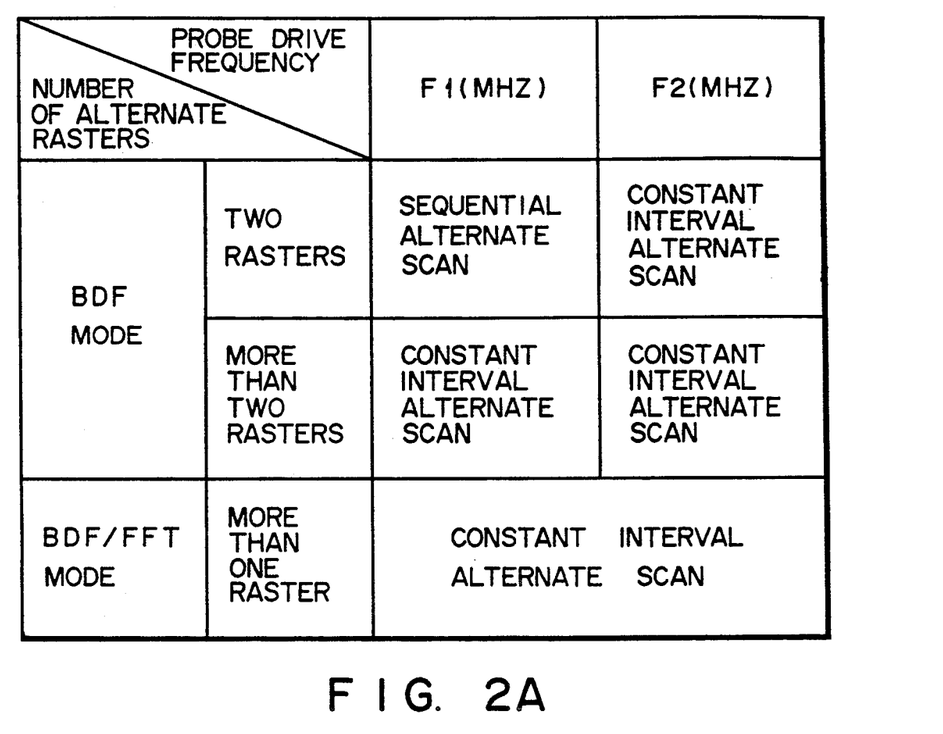
FIGS. 2A and 2B are diagrams for use in explanation of the function of the scan controller of FIG. 1.
Figure 2B:
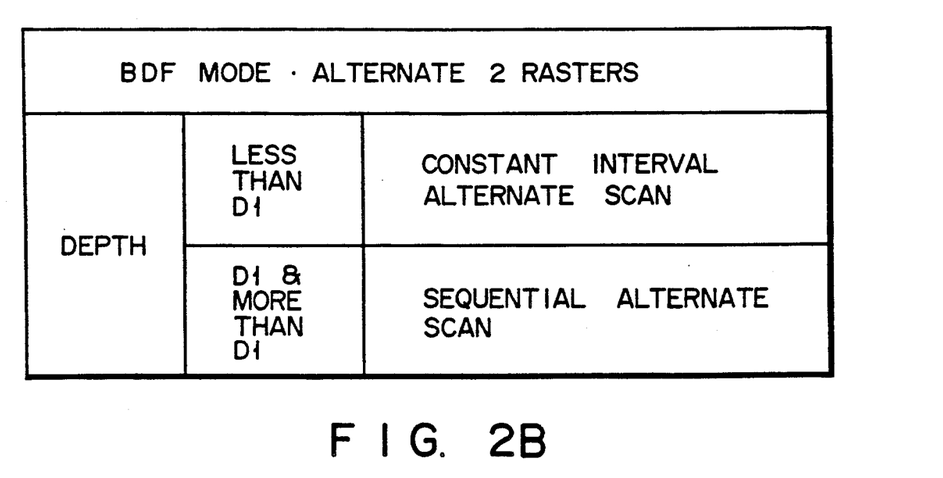
Figure 3:
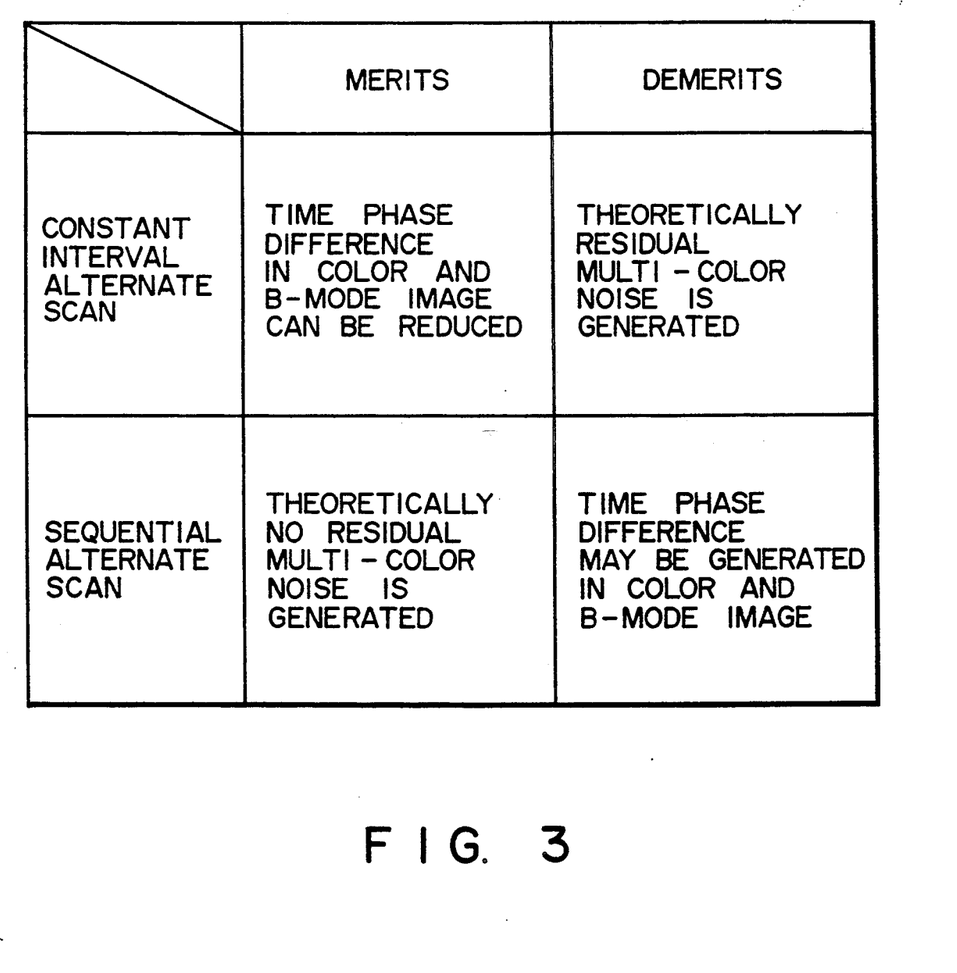
FIG. 3 is a diagram illustrating the trade-off of sequential alternate scanning and constant interval alternate scanning modes.

The scan controller 15a includes a memory which stores such a probe information table as shown in FIG. 2a. In response to the instruction signals from the controller 12 and the probe driving frequency F1 or F2 corresponding to probe information of the probe 1, the scan controller 15a reads sequential alternate scanning information or constant interval alternate scanning information out of the memory for application to the transmitter/receiver circuit 2. The transmitter/receiver circuit 2 drives the probe 1 with the probe driving frequency F1 or F2 corresponding to the probe information. In this case, one of the sequential alternate scanning information and the constant interval alternate scanning information is selected according to the subject under examination. That is, when a shallow region is observed, the sequential alternate scanning system is selected, while, when a deep region is observed, the constant interval alternate scanning system is selected. The merits and demerits of the sequential alternate scanning system and the constant interval alternate scanning system are illustrated in FIG. 3. The controller 12 of the above embodiment has a function of enabling selective determination of a display depth of a subject. Upon reception of a display depth data signal designated with a panel switch 10, the controller 12 controls the transmitter/receiver circuit 2, the MTI 4 and the CDC 6, on the basis of a probe information table (FIG. 2B) incorporated in the scan controller 15a. More specifically, one point D1 within the range of the display depth is selected as a boundary point, on the basis of the information table. (The point D1 is selected in consideration of the attenuation characteristics of a low-frequency ultrasonic beam. For example, it is a point 10 cm deep from the surface of the subject.) With respect to the region which is shallower than point D1, a constant interval alternate scan is performed in the ultrasonic scan mode. With respect to the region which is deeper than point D1, a sequential alternate scan is performed in the ultrasonic scan mode. Incidentally, the information table shown in FIG. 2B is used in the case where the BDF mode is selected and the number of repetitive scan raster is two.

Next, the operation of the ultrasonic imaging apparatus constructed as described above will be described with reference to drawings.

In FIG. 1, the instruction signals specifying the number of repetitive scanning rasters are first input from the panel switch 10 to the controller 12. At this time data representing the type of the ultrasonic probe is automatically read out of the probe 1 and then entered into the controller 12. The controller 12 outputs the input data to the scan controller 15a. Information representing a type of alternate scanning system and a probe driving frequency F1 or F2 are read out of the probe information table provided in the scan controller 15a and shown in FIG. 2 in accordance with the data applied to the scan controller.

Figure 4:
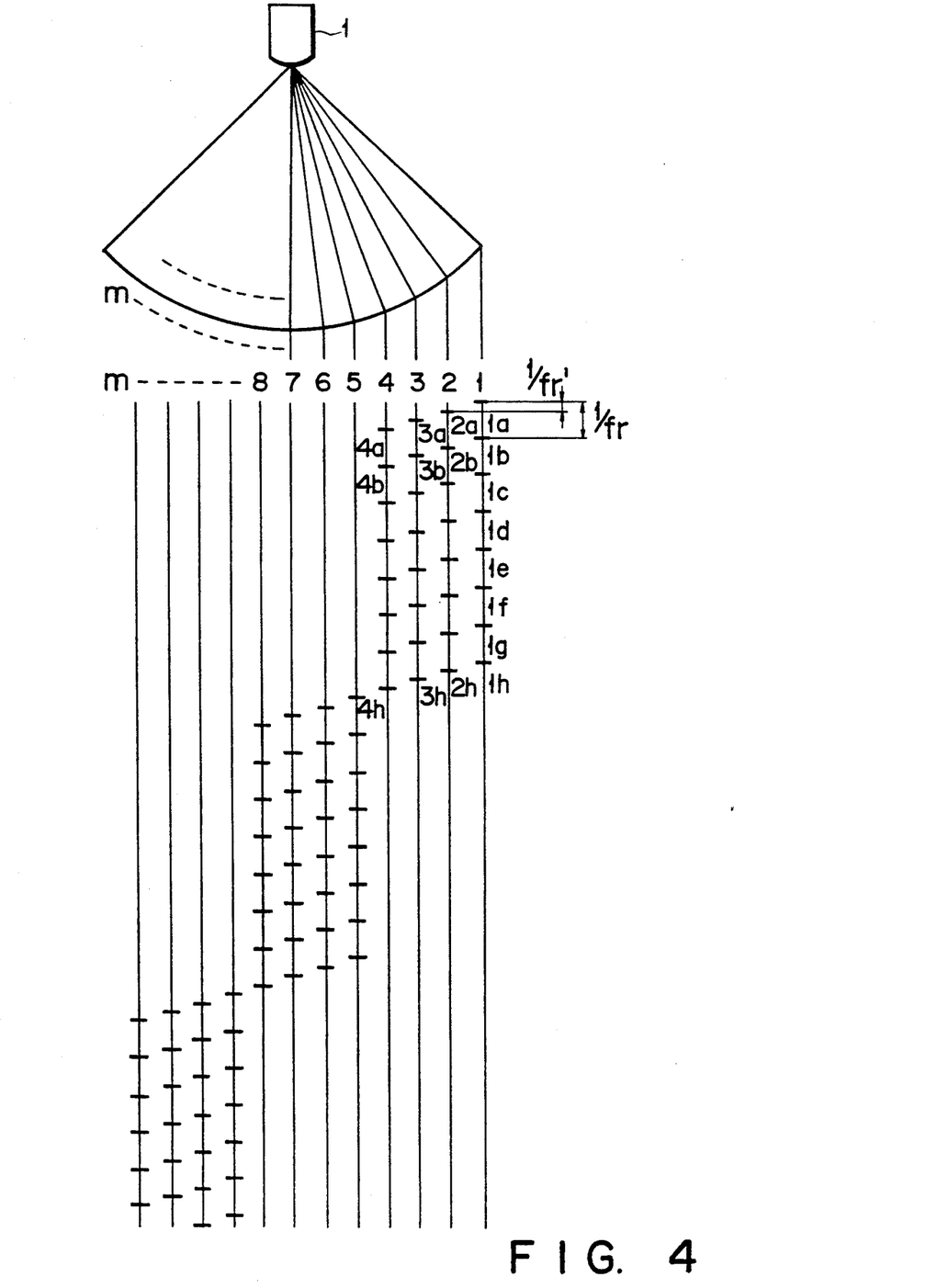
FIG. 4 is a diagram for use in explanation of a sequential alternate scanning mode.

When the operation mode is set to the BDF mode, the number of repetitive scanning rasters is set to two and the driving frequency is set to F1 by way of example, the sequential alternate scanning information is read from the memory. The scanning information and the probe driving frequency F1 are sent to the transmitter/receiver circuit 2. Control signals are likewise sent from the scan controller 15a to the MTI 4 and DSC 6. Thereby, the ultrasonic probe 1 is driven by the transmitter/receiver circuit 2 at the frequency F1 so that the sequential alternate scanning illustrated in FIG. 4 is carried out. That is, when the subject is scanned by ultrasonic beams starting with an ultrasonic beam from the rightmost end of the probe 1 as shown in FIG. 4, the scanning in the case of four-raster repeating scanning is performed in the sequence of the first raster (points 1a to 1h of No. 1) on the right side, the second raster (points 2a to 2h of No. 2), the third raster (points 3a to 3h of No. 3), the fourth raster (points 4a to 4h of No. 4), the first raster (points 1a to 1h of No. 1), etc. That is, a scanning mode is carried out in which the entire scanning area is divided into a plurality of scanning blocks each having a predetermined number of rasters, the rasters of each scanning block are scanned repeatedly and echo data at a predetermined number of sampling points in each raster are extracted for each of blocks.

The subject under examination is subjected to the sequential alternate scanning in such a manner as described above and echoes from the living body are converted to echo signals by the probe 1. The echo signals are subjected to signal processes, such as amplifying and delaying, in the transmitter/receiver circuit 2 and then detected by the phase detector 3a so that a signal is produced which comprises a Doppler shift signal and clutter components. The signal is converted by an analog to digital converter not shown to a digital signal which is entered into the MTI (moving target indicator) 4 where the clutter components are removed. The frequency components of the Doppler shift signal resulting from blood flow are analyzed by the frequency analyzer to calculate the Doppler velocity, turbulence and power. Such information is subjected to color processing and then written into a frame memory in the DSC 6.

Also, the output signal of the transmitter/receiver circuit 2 is fed into the B-mode processing circuit 3b for envelope detection and the detected black and white data is sent to the DSC 6. The detected signal from the phase detector 3a is frequency analyzed by the FFT 5 for subsequent application to the DSC 6.

At the time when n=8 pieces of data are fed into the DSC 6 for each of scan lines, the 8 pieces of data for its scan line are read from the DSC 6 to the TV monitor 7 as blood flow information.

Figure 5:
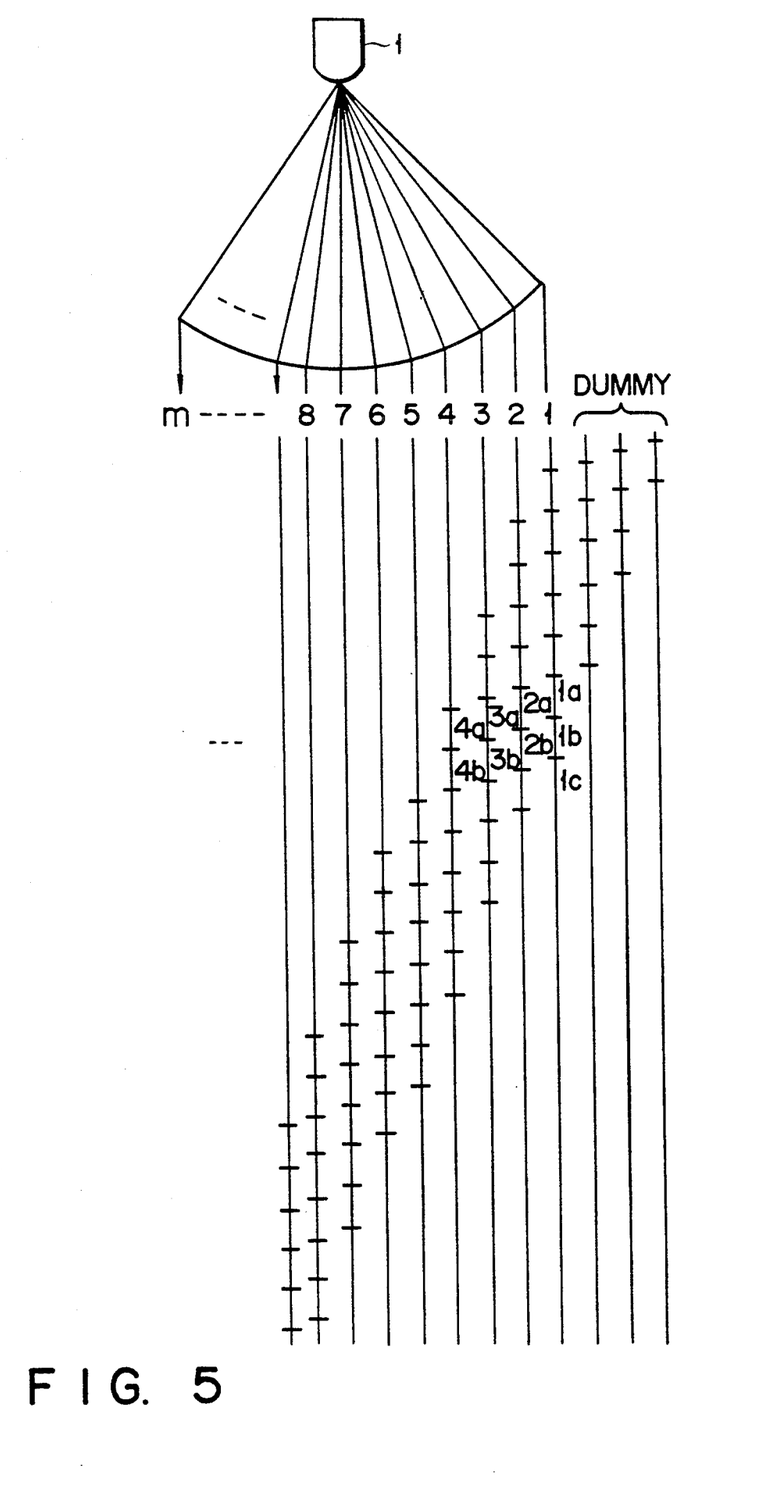
FIG. 5 is a diagram for use in explanation of a constant interval alternate scanning mode.

On the other hand, when the probe driving frequency F2 information for two-raster repeating scanning is read from the probe information table, the constant interval alternate scanning information and the probe driving frequency F2 information are fed into the transmitter/receiver circuit 2 so that the scanning mode is switched from the sequential alternate scanning mode to the constant interval alternate scanning mode. In the constant interval alternate scanning mode, where the constant interval scanning mode is used in which, for example, four rasters are scanned repeatedly, the subject is sector scanned in the sequence of point 1a of raster No. 1, point 2a of raster No. 2 point 3a of raster No. 3. point 4a of raster No. 4. point 1b of raster No. 1, point 2b of raster No. 2, point 3b of raster No. 3, point 4b of raster No. 4, etc. That is, a scanning mode is carried out in which the sequential scanning of the same rasters is repeated a predetermined number of times and data are output at constant intervals.

Where, in the BDF mode, the number of rasters to be scanned repeatedly is 3 or more than 3, the constant interval alternate scan is performed independently of the probe driving frequency F1 or F2. The constant interval alternate scan is likewise performed in the BDF/FFT mode independently of the number of rasters to be scanned repeatedly and the probe driving frequency.

According to the present embodiment, as described above, by changing the number of rasters to be scanned repeatedly and the probe driving frequency which are used as parameters, switching is made between the sequential alternate scan mode and the constant interval alternate scan mode. Thus, since the attenuation of reflected Doppler signals is low when the probe driving frequency is relatively low, the sequential alternate scan may be used on the condition that the number of rasters to be scanned repeatedly is two, thereby reducing not only the time difference but also the residual multi-color noise.

When the probe driving frequency is relatively high, on the other hand the attenuation of reflected Doppler signals is high. If, in this case, the constant interval alternate scan is used, few residual multi-echoes will be generated and moreover no time difference will be generated. That is, by effectively utilizing the merits of the sequential alternate scan and the constant interval alternate scan as illustrated in FIG. 3, it becomes possible to improve the detection of the low flow velocity for good ultrasonic imaging.

Figure 6:
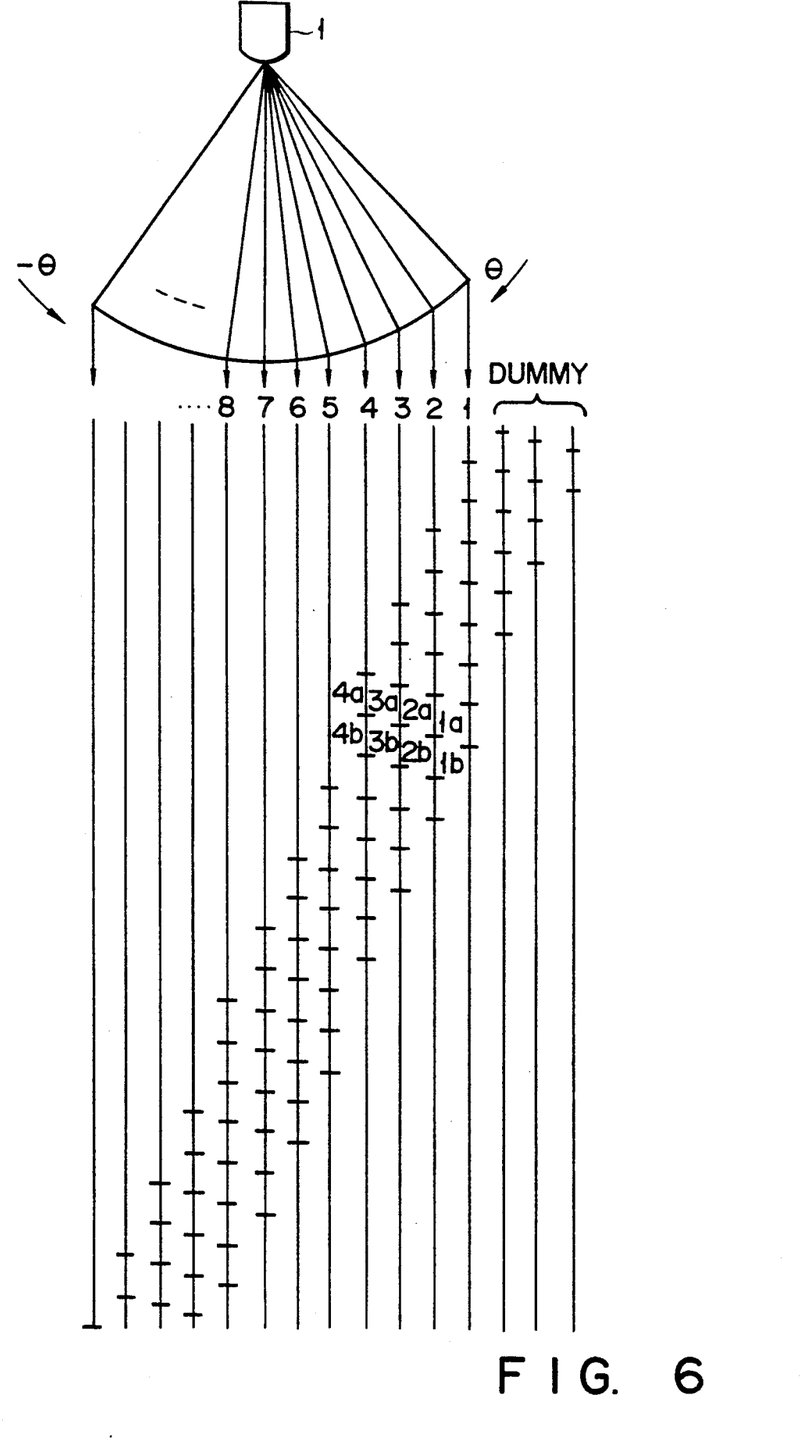
FIG. 6 and FIG. 7 are diagrams for use in explanation of another constant interval alternate scanning mode.
Figure 7:
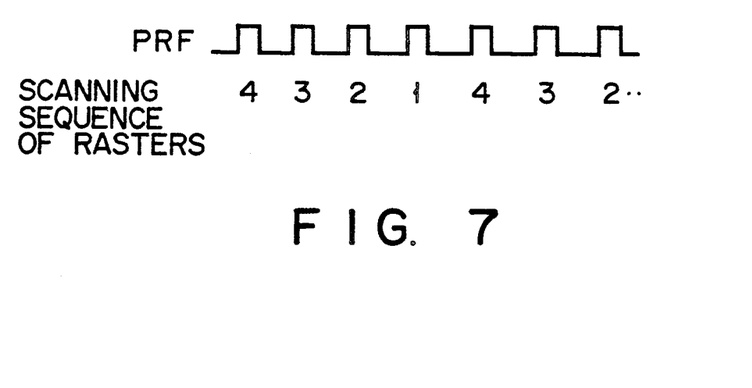

Next, another constant interval alternate scanning method which is four in the number of rasters to be scanned repeatedly will be described with reference to FIG. 6.

According to this constant interval alternate scanning method, the transmitter/receiver circuit 2, MTI 4 and DSC 6 are controlled so as to reduce the sampling frequency of Doppler information without altering the ultrasonic pulse repetition frequency and make scanning of ultrasonic rasters, which have been obtained by a plurality of receptions of ultrasonic waves, opposite to the direction $\theta$ of scan, namely, in the direction of $-\theta$.

That is, the scanning sequence of the ultrasonic rasters is opposite to the direction of scan $\theta$ so that raster No. 4, raster No. 3, raster No. 2, raster No. 1, raster No. 4, raster No. 3, etc. are alternately scanned four times.

According to this alternate scan, the raster before the ultrasonic raster No. 3 is No. 4 and thus residual echoes acting upon the raster No. 3 mostly derive from the raster No. 4 and the affect due to the residual multiple echoes can be concentrated to only first several number of rates of the raster No. 3. Therefore, if the first several number of rates of the raster No. 3 are cut off, no affect due to the residual multiple echoes causes.

Figure 8:
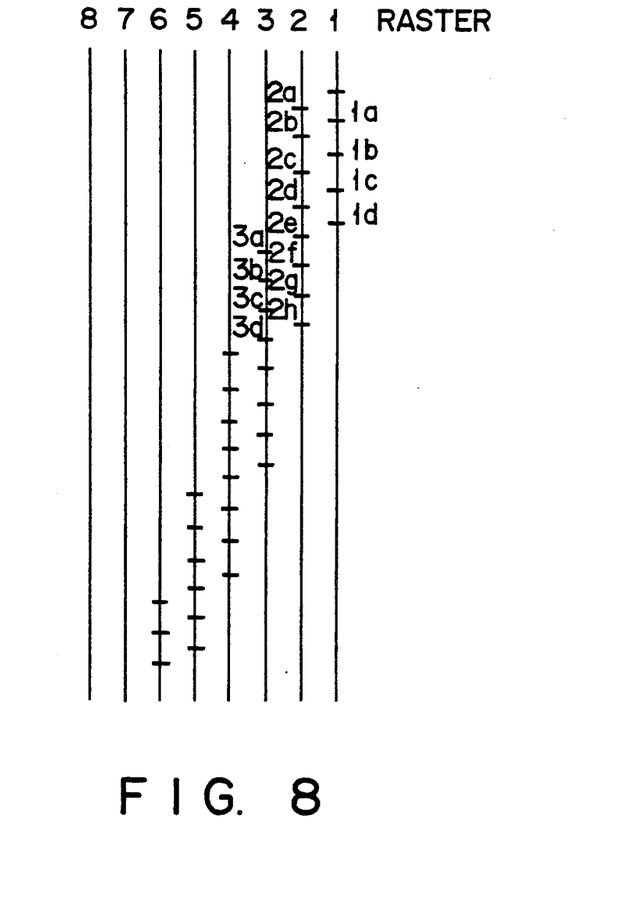
FIG. 8 is a diagram for use in explanation of still another constant interval alternate scanning mode.

In the case of the alternate scan of FIG. 8 in which the number of rasters to be scanned repeatedly is two, the first five pieces of data (2a through 2e) in the ultrasonic raster No. 2 include residual echoes from the raster No. 1 (1h through 1d) and the subsequent three pieces of data (2f through 2h) are affected by residual echoes from the raster No. 3 (3a through 3c). Thus, the alternate two-raster constant interval alternate scan cannot reduce the multi-color noise due to residual echoes.

By the use of the present invention described above by which switching is made between the scanning systems in accordance with the number of rasters to be scanned repeatedly and the probe driving frequency used, the alternate two-raster scan illustrated in FIG. 8 can be changed to the sequential alternate scanning system. The present invention may also be applied to such an alternate scanning system.

A description will be given as to how a diagnosis image is obtained with respect to a shallow region of a subject (i.e., a region which is within a short distance from the surface of the subject) in the diagnosis modes mentioned above.

First of all, the operator operates the panel switch 10, so as to supply data regarding a desirable diagnosis depth D1 of the subject to the controller 12. In accordance with this data, the controller 12 controls the scan controller 15a. On the basis of the information table, the scan controller 15a selects a scan mode corresponding to the data which pertains to depth D1. More specifically, if the depth D1 represented by the data is less than a predetermined value (e.g., 10 cm), the scan controller 15a selects a constant interval alternate scan mode. If it is larger than the predetermined value, the scan controller 15a selects a sequential alternate scan mode. Then, the scan controller 15 supplies a signal corresponding to the selected scan mode to both the transmitter/receiver circuit and the MTI 4. As a result, the subject is scanned in either the constant interval alternate scan mode or the sequential alternate scan mode. Since, in this manner, the scan system is switched in accordance with the diagnosis depth of the subject, it is possible to produce a diagnosis image in which the adverse effects arising from the time phase difference is suppressed.

Although, in the above embodiments, descriptions were made of the alternate four-raster scanning system and the alternate two-raster scanning system, the number of rasters to be scanned alternately is not limited to four or two.

According to the above embodiments, by changing the number of rasters, i.e., the number of rasters to be scanned alternately and the probe driving frequency as parameters, the scanning mode is switched between the sequential alternate scanning mode and the constant interval alternate scanning mode. If the sequential alternate scanning is used for the two-raster alternate scanning in the case of a relatively low probe driving frequency in which the attenuation of reflected Doppler signals is low, therefore, not only the time phase difference but also the residual multi-color noise will be reduced, because a relatively deep ROI is observed with a low enlargement ratio on a display.

In the case of a relatively high probe driving frequency in which the attenuation of reflected Doppler signals is large, the use of the constant interval alternate scanning will generate few residual multi-echoes and produce no time phase difference.

If an ultrasonic probe is driven by two different frequencies, the luminance difference (output gradation difference) appears on the display. The method for taking measures against the above disadvantage will be described next with reference to FIG. 9.

Figure 9:
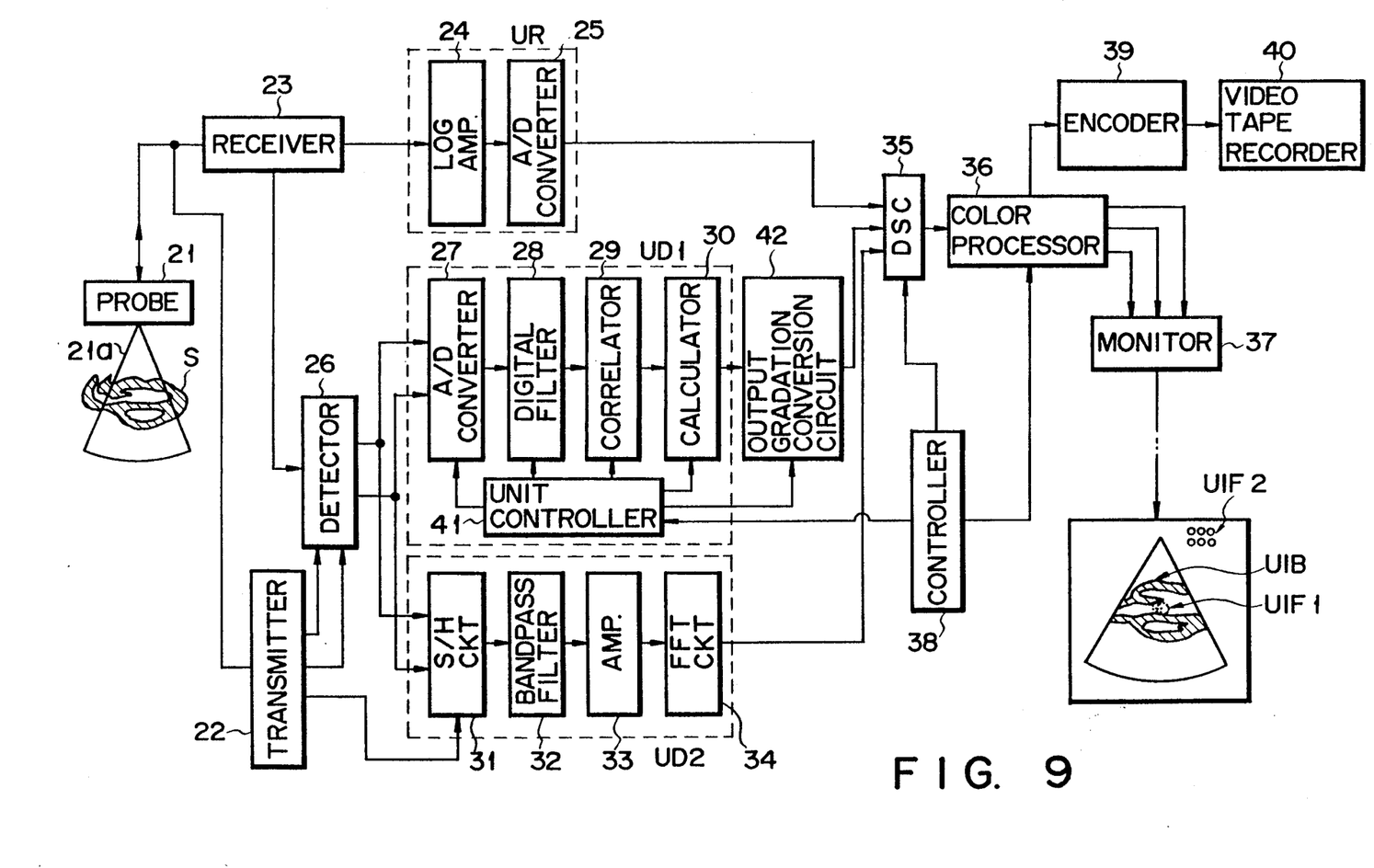
FIG. 9 is a block diagram of an ultrasonic imaging apparatus according to the other embodiment of the present invention.

An ultrasonic probe 21 is driven by an excitation frequency selected according to an object for diagnosis and comprises an array of plural transducer elements. The probe 21 has a part adapted for B-mode and M mode sector scan and a part adapted for ultrasonic Doppler mode, which may be provided integral with each other or separate from each other. A transmitter 22 transmits a B-mode or M-mode excitation signal to the probe 21.

A receiver 23 receives a B-mode or M-mode receive signal and a Doppler mode receive signal from the probe 21 for amplification and detection thereof. A B-mode or M-mode receiving circuit UR comprises a LOG amplifier 24 amplifies a B-mode or M-mode receive signal from the receiver 23 on a logarithmic basis and an A/D converter 25 converts an output signal of the LOG amplifier 24 to digital form. A detector 26 phase detects a Doppler shifted signal from the receiver 23.

In a blood flow information processing circuit UD1, a detected output signal of the detector 26 is converted by an A/D converter 27 to a digital signal which is, in turn, applied to a digital filter 28. The digital filter 28 has its filtering characteristics controlled by a unit controller 41 which is, in turn, controlled by a controller 38. By the digital filter 28 clutter components are removed from the digital signal. An output signal of the digital filter 28 is entered into a correlation circuit 29 to obtain its correlation. The result of correlation is entered into a calculation circuit 30 to obtain the flow velocity, turbulence, power and so on.

Between the blood flow information processing circuit UD1 and the DSC 35 is connected an output gradation control circuit, i.e., an output gradation conversion circuit 42, which varies the magnitudes of the outputs (blood flow velocity, turbulence, power and so on) according to the probe driving frequency under the control of the controller 38 and unit controller 41.

In an ultrasonic Doppler processing circuit UD2, the detected output signal of the detector 2 is sampled and held by a sample and hold circuit 31 and unwanted frequency components are removed from an output signal of the sample and hold circuit 31 by a bandpass filter 32. An output signal of the bandpass filter 32 is amplified by an amplifier 33 and then frequency analyzed by a fast Fourier transforming (FFT) circuit 34 for conversion to a Doppler shifted signal.

The DSC 35 converts the B-mode or M-mode image signal obtained from the B-mode or M-mode receiving circuit UR to a TV signal, converts a blood flow information output from the blood flow information processing circuit UD1 to a TV signal and converts a Doppler information signal from the ultrasonic Doppler processing circuit UD2 to a TV signal. A color processor 36 generates an RGB type of color TV information corresponding to the blood flow velocity obtained by the blood flow information processing circuit UD1.

On a color TV monitor 37 ar displayed superimposed upon each other the output signals of the DSC 35, namely, the output signal of the B-mode or M-mode receiving circuit UR, e.g., the B-mode image information UIB, the blood flow velocity information UIF1 from the blood flow information processing circuit UD1 and the Doppler information UIF2 of the ultrasonic Doppler processing circuit UD2.

The controller 38 provides filtering process information for determining a reference frequency of the probe 21 used to the digital filter 28 of the blood flow information processing circuit UD1 via the unit controller 41. An RGB type of television signal is converted by an encoder 39 to a composite video signal so that the image displayed on the color TV monitor 37 may be recorded by a video tape recorder 20.

In the foregoing ultrasonic imaging apparatus, an ultrasonic beam 21a of a desired frequency is transmitted by the transmitter 22 from the probe 21 to a living body S. An echo beam from the living body is converted by the probe 21 to an echo signal which is, in turn, converted to a B or M-mode signal and an ultrasonic Doppler signal by the receiver 23. The B or M-mode signal is sent to the receiving circuit UR for amplification in the LOG amplifier 24. The amplified signal is converted by the A/D converter 25 to a digital signal which is, in turn, recorded in the DSC 35.

On the other hand, the Doppler signal is detected by the detector 26 and then fed into the blood flow information processing circuit UD1 and the ultrasonic Doppler processing circuit UD2. The blood flow information processing circuit UD1 calculates the blood flow velocity, turbulence, power and so on from the Doppler signal and applies these values to the output gradation conversion circuit 42.

Figure 10:
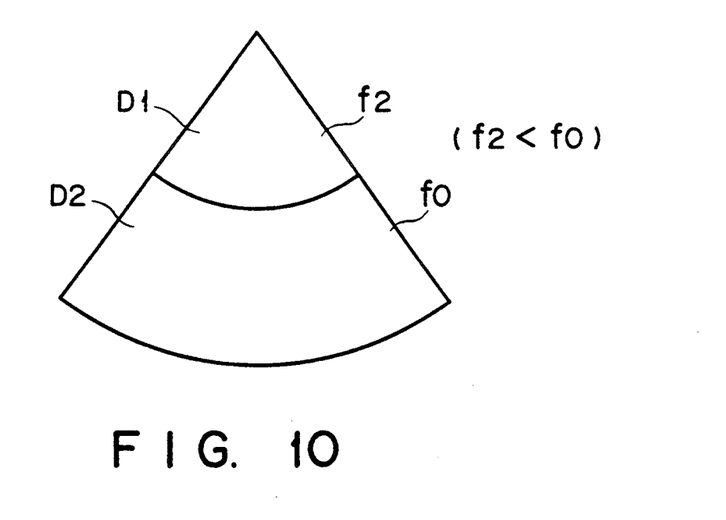
FIGS. 10 through 13 are diagrams for use in explanation of the operation of the embodiment of FIG. 9.

That is, if a region for diagnosis is divided into a shallow region D1 and a deep region D2 as illustrated in FIG. 10, a low driving frequency f2 and a high driving frequency f1 are assigned to the regions D1 and D2, respectively. In this case, the ultrasonic Doppler shifts in those regions D1 and D2 will be given by $$fd1 = 2\,V\,f2/C\,\cos\theta \qquad (6)$$

$$fd1 = 2\,V\,f2/C\,\cos\theta \qquad (7)$$

Where V is the blood flow velocity, C is the sound velocity and $\theta$ is an angle made by the ultrasonic beam and the blood flow. The output gradation characteristic for displaying the Doppler shift frequency signal will be represented as in FIG. 11. That is, the output gradation characteristic is represented as a straight line A which ranges from $-\frac{1}{2}f\gamma$ to $\frac{1}{2}f\gamma$ on the axis of ordinate representing the rate frequency $f\gamma$ and from $-K$ to $K$ on the axis of abscissa representing the output gradation.

Figure 11:
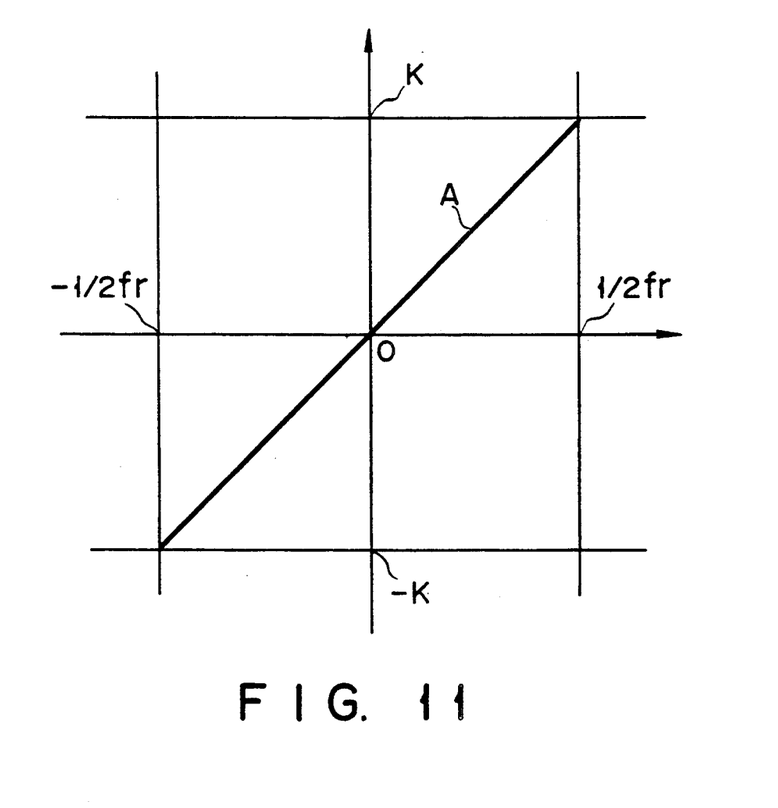

From the characteristic of FIG. 11 the output gradation corresponding to the Doppler shift frequency fd will be given by $$f\gamma/2 : K = fd : x \qquad (9)$$

$$f\gamma/2 \cdot x = K \cdot fd$$

$$x = 2K/f\gamma \cdot fd$$

Substituting equation (9) into equations (7) and (8) yields $$x_1 = (2K/fy) \cdot (2Vf_2/C)\cos\theta \tag{10}$$

$$x_2 = (2K/fy) \cdot (2Vf_0/C)\cos\theta \tag{11}$$

As is evident from equations (10) and (11), if the probe driving frequencies differ in the shallow and deep regions as f2 and f0, different output gradations will result even if the shallow and deep regions are equal in blood flow velocity. This will make an image with a difference in color appear.

Figure 12:
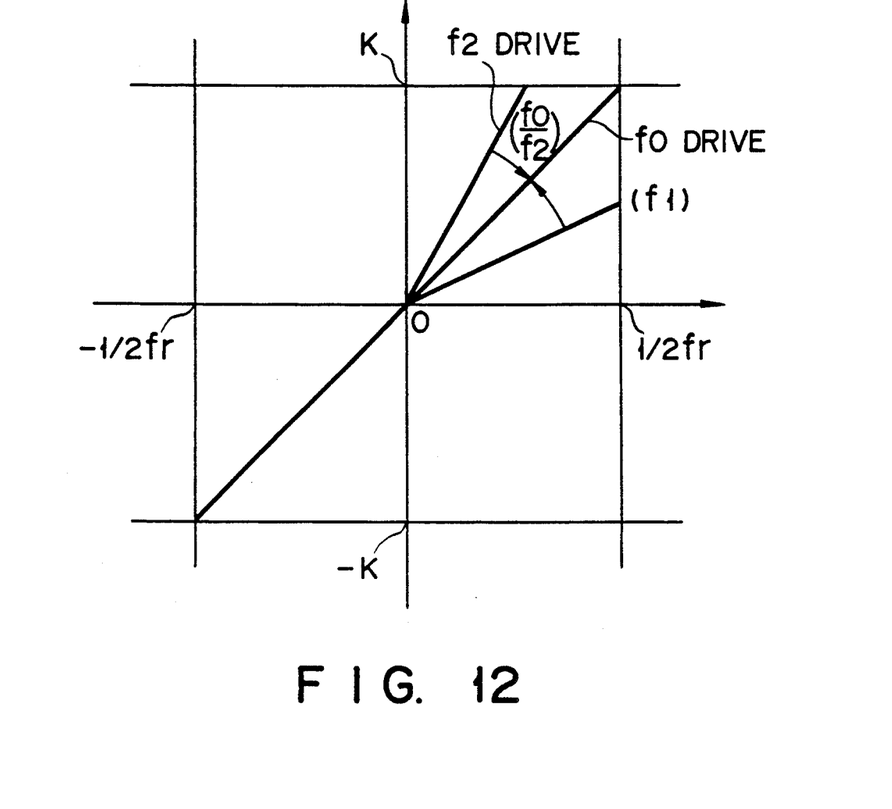
Figure 13:
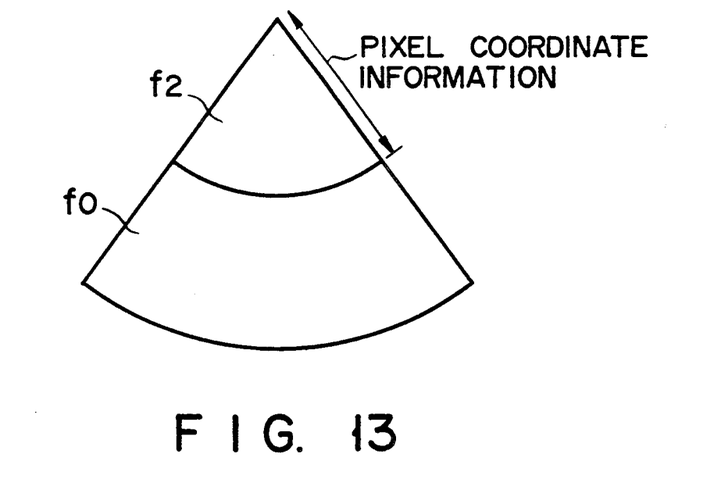

In the present invention, therefore, the operating frequency f0 is taken as a criterion and the output gradation for the driving frequency f2 is multiplied by f0/f2 for compensation in equations (10) and (11). As a result, a diagnostic image with no difference in color will be obtained. This condition is illustrated in FIG. 12. Such an output gradation compensation is effected by the output gradation conversion circuit 42 of FIG. 9. As illustrated in FIG. 13, pixel coordinate information is referred to for each of rasters in a diagnostic region in order to recognize the limit of the probe driving frequency.

Various signals related to blood flow and compensated by the output gradation conversion circuit 42 are recorded in the DSC 35.

The detected output sent to the ultrasonic Doppler processing circuit UD2 is sampled and held by the sample and hold circuit 31, filtered by the bandpass filter 32, amplified by the amplifier 13 and converted to a Doppler shift signal by the FFT circuit 34.

Various kinds of data recorded in the DSC 35 are converted to a TV scan signal under the control of the controller 38 and then sent to the color processor 36. In the color processor 36, color brightness information is added to a blood flow velocity signal output from the blood flow information processing circuit UD1 and then the resultant signal is supplied to the TV color monitor 37 together with other data signals. Thereby, on the TV monitor 37 are displayed superimposed upon each other black and white B-mode image information UIB corresponding to a receive signal received by the M-mode receiving circuit UR, color blood flow velocity information UIFI corresponding to a receive signal of the blood flow information processing circuit UD1 and black and white Doppler information UIF2 corresponding to a receive signal of the ultrasonic Doppler processing circuit UD2.

In the foregoing embodiment, the probe driving frequency is varied with the depth of a region of interest. Alternatively, the reference frequency for the phase detection may be varied with the probe driving frequency fixed. In this case, the deviation of the output gradation can be avoided by a difference in reference frequency.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. An ultrasonic imaging apparatus comprising:
    ultrasonic transducer means for transmitting an ultrasonic beam to a subject and converting echoes from the subject to echo signals;
    scan switching means for selectively switching a scanning mode between a first scanning mode and a second scanning mode, said first scanning mode being for repeatedly scanning a predetermined number of rasters in each of a plurality of scanning blocks, each of said rasters having a predetermined number of sample points, and echo signals at said sample points of said rasters are extracted block by block, and said second scanning mode being for repeatedly scanning a plurality of rasters a predetermined number of times while at least one raster is shifted sequentially and data are output at constant intervals;
    means coupled to said ultrasonic transducer means and said scan switching means for driving said ultrasonic transducer means in accordance with a scanning mode selected by said scan switching means;
    image processing means for signal processing said echo signals output from said ultrasonic transducer means to output an image signal; and
    television monitor means for displaying said image signal output from said image processing means as an image.

2. An ultrasonic imaging apparatus according to claim 1, in which said scan switching means comprises scanning mode specifying means for generating an instruction signal to specify a scanning mode, means having a memory for storing a probe information table and responsive to said instruction signal from said scanning mode specifying means and frequency information about a driving frequency of said ultrasonic transducer means for reading first scanning mode information and second scanning mode information out of said memory and outputting them to said driving means.

3. An ultrasonic imaging apparatus according to claim 2, in which said scanning mode specifying means specifies said first and second scanning modes for a shallow region and a deep region of the subject, respectively.

4. An ultrasonic imaging apparatus according to claim 1, in which said image processing means comprises receiver circuit means for performing signal processes including amplifying and delaying processes on said echo signals to output a receive signal, detector means for detecting said receive signal to produce a Doppler shift signal, and frequency analyzing means for frequency analyzing said Doppler shift signal to obtain containing blood flow velocity, turbulence and power and outputting said information as an image signal.

5. An ultrasonic imaging apparatus comprising:
    ultrasonic transducer means for transmitting ultrasonic beams to a subject under examination and converting echoes from the subject to echo signals;
    selecting means for selecting a driving frequency of said ultrasonic transducer means in accordance with the depth of a region of interest of the subject;
    detecting means for detecting a first diagnostic signal including a B-mode signal and a second diagnostic signal including a Doppler signal from said echo signals output from said ultrasonic transducer means;
    gradation control means for subjecting a graduation correction to said second diagnostic signal, output from said detecting means and corresponding to a depth of said region of interest in accordance with the driving frequency selected by said selecting means to output a gradation corrected diagnostic signal; and television monitor means for displaying said first diagnostic signal and said gradation controlled diagnostic signal as an image.

6. An ultrasonic imaging apparatus comprising:

ultrasonic transducer means for transmitting ultrasonic beams to a subject and converting echoes from said subject to echo signals;

detector means for detecting said echo signals in accordance with a reference frequency determined according to the depth of a region of interest of said subject to output a detected signal;

detecting means for detecting a first diagnostic signal including a B-mode signal from said echo signals output from said ultrasonic transducer means and a second diagnostic signal including a Doppler signal from said detected signal from said detector means;

gradation control means for subjecting a graduation correction to said second diagnostic signal, output from said detecting means and corresponding to a depth of said region of interest in accordance with said reference frequency to output a gradation corrected diagnostic signal; and television monitor means for displaying said first diagnostic signal and said gradation corrected diagnostic signal as an image.

* * * * *